3,591,675
COMPOSITION AND METHOD FOR PREVENTING
FORMATION OF DENTAL PLAQUE
Herbert Brilliant, 191 Presidential Blvd.,
Bala-Cynwyd, Pa. 19004
No Drawing. Continuation-in-part of application Ser. No. 557,921, June 16, 1966. This application June 20, 1969, Ser. No. 835,267
Int. Cl. A61r 7/16
U.S. Cl. 424—54
2 Claims

ABSTRACT OF THE DISCLOSURE

A composition, essentially consisting of a substantially saturated aqueous solution of carbon dioxide and a cationic surface active agent, is applied to the teeth daily by a simple rinsing technique. Optionally, the composition could include ethyl alcohol. Preferably, the teeth should first be given a thorough prophylaxis by a dentist using a pumice paste applied with a motor-driven flexible cup in order to remove heavy accumulations of dental plaque and tartar that may be present; thereafter, such prophylaxis should be required with much less frequency than heretofore has been necessary if the novel composition is applied daily.

---

This application is a continuation-in-part of my copending application Ser. No. 557,921, filed on June 16, 1966 and now abandoned.

This invention relates to a novel brushless dentifrice and method for preventing the formation of dental plaque. More particularly, this invention is concerned with a novel means for preventing adherence to and between the surfaces of teeth of dental plaque, materia alba and food particles, and if already adhered then said means functions to remove same by physico-chemical debridement. It also is concerned with the provision of chemical vasodilatory actions which serve to massage the gums and increase the blood circulation thereof.

Dentifrices in many forms have been known, e.g. pastes, liquids and powders, but all have been dependent upon the use of a brush or equivalent mechanical abrading or massaging device to help remove plaque, materia alba, and other foreign material from the teeth and gums. While such cleansing methods have been effective for their intended purposes, undesirable side effects inevitably occur, the principal one being the erosion of tooth enamel, the gums, and tooth-supporting bone structure. Accordingly, an objective of dental research scientists long has been to provide a means for physico-chemical debridement, i.e., the non-surgical removal of unhealthy tissue or foreign matter from teeth and gums, without the use of abrasives which cause such erosion and create peridontal problems. The present invention accomplishes that objective, and at the same time serves to increase its prophylactic action by increasing the vascularity of the gingival tissues and hence the blood circulation therein. Attaining these objectives is exceedingly important in preventive dental medicine because dental scientists now know that accumulations of plaque, materia alba, and tartar are responsible for gum diseases and that by preventing the accumulation of these substances healthy gums are possible for the life of the individual.

The composition of the present invention which makes possible the achievement of the foregoing objectives consists primarily of an essentially saturated aqueous solution of carbon dioxide and a cationic surface actvie agent. Together, the carbon dioxide and the surfactant synergistically provide the physico-chemical debridement action, and also impart the vasodilating action upon the gingival tissues. Optionally, ethyl alcohol may be included in the composition to enhance its germicidal properties and to help increase the vascularity of the gingival and interproximal tissues.

Typically, the novel composition contains, in addition to a substantially saturated aqueous solution of carbon dioxide, from 0.1 to about 20.0% by volume of the cationic surface active agent. When ethyl alcohol is employed, it is present in amounts ranging from about 1.0 to about 100% by volume.

Preferably, from 0.1 to 10.0% by volume of the surfactant is employed, and in the optional compositions which include alcohol it is normally present in amounts ranging from 1.0 to 10% by volume.

Optionally, a mixture of different cationic surface active agents may be incorporated, and flavoring or other inert materials may be added.

A typical formulation in accordance with the present invention is as follows:

| | Percent by volume |
|---|---|
| Cationic surface active agent | 0.1–20.0 |
| Ethyl alcohol | 1.0–10.0 |
| Flavoring agent | 0.1–0.5 |
| Saturated aqueous solution of $CO_2$,[1] q.s. | |

[1] q.s.=quantity sufficient to make up balance of 100% of solution.

The carbon dioxide component must be present in a substantially saturated aqueous solution. When the concentration of $CO_2$ falls below an essentially saturated state the composition fails to function satisfactorily. Thus, if the entire composition is prepared and bottled for some time prior to use it had best be charged with sufficient $CO_2$ gas from a pressurized container of the gas. $CO_2$-gas-forming ingredients (such as a carbonate and a mild acid), if packed with the surfactant will not satisfactorily function to saturate the solution with carbon dioxide. However, it is quite satisfactory to simultaneously mix together, just before the time the composition is to be used, the cationic surfactant and the $CO_2$ which is formed from the reaction of a solid or liquid with an acid. In fact, a convenient way of mixing these materials together in the practice of the present invention is to utilize two bottles or other suitable containers, one of which contains the cationic surface active agent and a $CO_2$-forming substance, and the other containing a mild acid such as dilute acetic acid. When the bottles are emptied into a tumbler or other receptacle, the acid reacts with the source of the $CO_2$ to evolve the gas in a rapid stream which mixes together with the surfactant just before the mixture is applied to the teeth.

EXAMPLE 1

The invention can be demonstrated in laboratory-controlled tests with spectacular success. For example, one such demonstration was conducted on five men who were dental students in a leading university in the eastern part of the United States. In this test a professional dentist, using professional dental equipment, on a Monday morning gave the students a thorough prophylaxis with a pumice paste applied with a motor-driven cup. All visible stains and other foreign matter were removed from the teeth. The students then were required to rinse their mouths with a disclosing solution consisting of a tablespoon of water containing five drops of an erythrosine dye, swishing the solution all over their teeth and gums for 60 seconds. All foreign matter such as dental plaque and materia alba was dyed red. Photographs were taken to record these findings, using equipment specially designed for oral photographic documentation.

The students were required not to brush their teeth for five consecutive days. However, four times each day, after each meal and before retiring at night, they were required to rinse out their mouths for 60 seconds with a 4-ounce solution containing the following formulation:

| | Percent by volume |
|---|---|
| Benzethonium chloride | 2.0 |
| Cetylpyridinium chloride | 1.0 |
| Ethyl alcohol | 10.0 |
| Flavoring agent | 0.05 |
| Saturated aqueous solution of $CO_2$ | q.s. |

Each morning, through Friday, the fifth day, the students had their teeth stained again with the erythrosine dye solution, and a color photograph taken each day to record the condition made visible by the dye.

The students were permitted to resume their normal teeth cleansing habits after the dye-photographic check on Friday morning. On the next succeeding Monday morning the dentist again gave them a professional prophylaxis as before, then stained their teeth with the same disclosing solution and made another photographic record as before. This time the students were required not to brush their teeth or rinse their mouths with the carbon-dioxide-containing solution. On the next day, Tuesday morning, the disclosing dye treatment was employed and photographs taken. A comparison then was made of those photos with the photographic records of the previous five test days. The contrast was spectacular. The records showed that more foreign matter had accumulated on the teeth of each student in the preceding 24 hours, when they did not rinse with the solution of the present invention, than had collected on each of the five days when they had been using only that solution to rinse their teeth. What is more, the photographs taken on each of the five test days showed essentially no accumulation of foreign matter when compared with the photographs taken of the teeth immediately after the initial prophylaxis was administered. These tests clearly demonstrated that the novel solution of the present invention either prevented accumulation of dental plaque or other foreign matter on the teeth, or entirely removed it therefrom.

EXAMPLE 2

In similar tests to those in Example 1 the same formulation is employed, except that the alcohol is omitted. The same relatively plaque and other foreign-matter-free teeth are noticed at the end of the five-day period of daily rinsing with the novel composition. On the sixth day, after skipping the rinsing and other brushing of the teeth for 24 hours, the same spectacularly contrasting accumulation of foreign matter will be noted as was seen in Example 1. In addition, it will be apparent that there is a diminished vasodilatory effect upon the gingiva in comparison with that obtained in the Example 1 tests.

EXAMPLE 3

In similar tests to those in Example 1 the same formulation is employed except that in one set, (a), both the alcohol and the cetylpyridinium chloride are omitted, and in another set, (b), both the alcohol and the benzethonium chloride are omitted. In both sets of tests there will be noticed at the end of the five-day period of daily rinsing with the novel composition essentially the same relatively plaque-free and other foreign matter-free teeth. Again, upon skipping the rinsing and other brushing of the teeth on next 24 hours, the same spectacularly contrasting accumulation of foreing matter will be noted as was seen in Example 1.

EXAMPLE 4

In tests performed similarly to those in Example 1, but using only warm water as the rinsing agent, each day an increasing accumulation of plaque and other foreign matter is noticed so that before or by the end of the five-day test period the condition of the teeth is about the same as it is when the dentist applies the pre-rinsing series prophylaxis with the pumice cup.

EXAMPLE 5

In tests performed similarly to those in Eaxmple 1, but omitting both the alcohol and the surface active agent, the results each day will be quite comparable to those obtained in Example 4 when plain water is used as the rinse agent. The results conclusively demonstrate that the saturated aqueous carbon dioxide solution without the surface active agent is not very effective in preventing or removing dental plaque and other such foreign matter.

EXAMPLE 6

In tests performed similarly to those in Example 1, but omitting both the alcohol and the carbon dioxide, the results each day are about comparable to those obtained in Examples 4 and 5. These results conclusively demonstrate that the cationic surface active agent without the carbon dioxide is not very effective in preventing or removing dental plaque and other such foreign matter.

EXAMPLE 7

In two series of five tests, in one series each test is performed similarly to those in Example 1 and in the other series each test is performed similarly to those in Example 2, a different cationic surface active agent is used instead of cetylpyridinium chloride and benzethonium chloride, only one surfactant being used throughout both series. Also, instead of using 1.0% by volume of the surfactant for each of the tests, in one instance only 0.1% of the surfactant is used, in the case of another individual only 0.5% is used, in the case of another individual 1.0% is used, in a third instance 5.0% is used, in a fourth instance 10.0% is used, and for the last person tested a 20.0% concentration of the surfactant is used. For the first individual the surfactant used is dimethyl ammonium bromide, for the second Victamine C (a cationic wetting agent of the type $C_{12}H_{25}NH(OR)PO(ONH_3C_{12}H_{25})$ in which R is a water-solubilizing group made by the Victor Division of the Stauffer Chemical Company), for the third N - alkylbenzyl - N,N-dimethyl-N-benzylammonium chloride is used for the fourth methyldodecylbenzyltrimethylammonium chloride is used, and for the fifth alkylpyridinium chloride is used. In each instance the results obtained are quite similar to those obtained in Examples 1 and 2, respectively, the teeth being substantially devoid of dental plaque and foreign matter even as seen by the critical eye of the experienced dentist during the days in which the $CO_2$-surfactant rinses are employed, and within a day or so after those rinses are terminated the teeth are very noticeably encrusted with much plaque and/or other foreign matter.

EXAMPLE 8

In U.S. Pat. Re. 16,593 issued on Apr. 19, 1927 to Freng there is disclosed a method for cleansing teeth which consists of spraying the teeth with a liquid dentifrice, such as sodium perborate, which has been saturated with carbon dioxide. The described object is to have the carbon doxide produce an emulsion of the saliva and simultaneously dissolve the tartar or other calcareous deposits on the teeth.

(a) To five patients whose teeth have been given a conventional prophylaxis by a dentist, as in Example 1, there is applied to the teeth for five consecutive days a spray for 60 seconds of the type disclosed by Freng. Each day there will be noted an increasing accumulation of plaque and other such deposits very similar to the results described in Examples 5 and 6 above.

(b) The teeth of the same five patients are again given a prophylaxis by a dentist, and for five consecutive days are caused to rinse their teeth for 60 seconds with the $CO_2$-surfactant composition of Example 1 minus the alcohol. As in Example 1 there will be no noticeable accumulation of plaque during the entire five-day period.

(c) The teeth of the same five patients are again given a prophylaxis by a dentist, and for five consecutive days they apply to their teeth for 60 seconds a spray of the type disclosed by Freng, modified to contain 2.0% cetylpyridinium chloride. In the first day or two the deposition of plaque or other foreign matter may not be very noticeable, but by the third day it will be evident that plaque has formed in appreciable amounts even to the most unskilled observer. The same results will be found when the spray is exactly the same composition as that used in Example 1 above, minus the alcohol.

From the foregoing it will be obvious that my invention has various possible modes of operation, all within the purview of the inventive concept. For example, practically any cationic surface-active agent may be employed, alone or in a mixture of two or more, and at any amount within the limits specified hereinabove. There are many well-known cationic surface-active quaternary ammonium germicides which are known to be useful in sanitation applications because of their germicidal activities; all of them could serve in the present invention. Examples are alkyldimethylbenzylammonium chloride, alkyldimethyl-3,4 - dichlorobenzylammonium chloride, alkyldimethylethylammonium bromide, alkyldimethylethylammonium chloride, alkyltrimethylammonium bromide, alkylbenzyltrimethylammonium chloride, alkyltolylmethyltrimethylammonium chloride, p - diisobutylphenoxyethoxyethyldimethylbenzylammonium chloride, p - diisobutylcresoxyethoxyethyldimethylbenzylammonium chloride, N-(acylcolaminoformylmethyl) - pyridinium chloride, and alkylpyridinium bromide.

The method of application of the novel formulation may vary to some extent, the major variations being in the time and mode of contacting the teeth and gums with the formulation. At least about 60 seconds of application is quite essential. Rinsing, and swishing the composition in the mouth for that period of time is the preferred way. Alternatively, a cotton swab may be used to apply the composition, but in doing so care must be taken to leave the treated areas well covered with the medicament for the full time period. In each case, of course, application should follow a dental prophylaxis which puts the teeth in clean condition at the start of the treatment of the present invention; from then on the novel method and composition which I have disclosed will take over the job of keeping the teeth substantially free of plaque.

I claim:

1. A synergistic composition for inhibiting the formation of dental plaque whose active ingredients consist of an essentially saturated aqueous solution of carbon dioxide, about 15% by volume of ethyl alcohol, about 1% by volume of cetyl pyridinium chloride, and about 2% by volume of benzethonium chloride.

2. The method of inhibiting formation of dental plaque on essentially plaque-free teeth of a living human being which consists of rinsing the teeth each day by swishing a plaque-inhibiting liquid composition around and over the teeth for at least about 60 seconds, said composition consisting of the composition of claim 1.

References Cited

UNITED STATES PATENTS

| | | | |
|---|---|---|---|
| Re. 16,593 | 4/1927 | Freng et al. | 424—49 |
| 3,147,182 | 9/1964 | Masci et al. | 424—54 |

OTHER REFERENCES

Sagarin: Cosmetics: Science and Technology, published by Interscience Publishers, Inc., N.Y., 1957, p. 374.

RICHARD L. HUFF, Primary Examiner